United States Patent [19]

Kruesi

[11] 4,179,492

[45] Dec. 18, 1979

[54] PROCESS FOR MAKING RARE EARTH METAL CHLORIDES

[75] Inventor: Paul R. Kruesi, Golden, Colo.

[73] Assignee: Cato Research Corp., Wheatridge, Colo.

[21] Appl. No.: 813,884

[22] Filed: Jul. 8, 1977

[51] Int. Cl.$^2$ ............................................. C01F 17/00
[52] U.S. Cl. ................................... 423/263; 423/21.1; 423/DIG. 12; 423/491; 423/492; 423/493; 423/495; 423/497; 75/111; 75/112; 75/113
[58] Field of Search ................. 423/DIG. 12, 263, 21; 75/111–113

[56] References Cited

U.S. PATENT DOCUMENTS

| | | | |
|---|---|---|---|
| 1,388,086 | 8/1921 | Ashcroft | 75/112 |
| 3,894,927 | 7/1975 | Kane et al. | 423/149 |
| 4,024,221 | 5/1977 | Becker et al. | 423/DIG. 12 |
| 4,029,733 | 6/1977 | Faugeras et al. | 423/DIG. 4 |
| 4,039,647 | 8/1977 | Wohleber et al. | 423/DIG. 12 |
| 4,039,648 | 8/1977 | Haupin et al. | 423/DIG. 12 |

FOREIGN PATENT DOCUMENTS 2295129  7/1976  France ............................... 423/DIG. 4

OTHER PUBLICATIONS

Beck et al. (1), "APC Publication Ser. No. 292742", published 7/13/43.
Beck et al. (2), "APC Publication Ser. No. 393258", published 7/13/43.
Spedding et al., "The Rare Earths", John Wiley & Sons, N.Y. 1961.

*Primary Examiner*—Herbert T. Carter
*Attorney, Agent, or Firm*—Sheridan, Ross, Fields & McIntosh

[57] ABSTRACT

A process for forming a metal chloride of a metal or its compound comprising forming a liquid fused salt bath mixture of at least two metal chlorides, the bath having the property of dissolving the formed metal chloride, and introducing the metal or compound into the liquid fused salt bath in the presence of chlorine to form the metal chloride and recovering the formed chloride from the liquid fused salt bath mixture. The metals which may be chlorinated are those from groups 1b, 2a, 2b, 3a, 3b, 4a, 5a and 8 of the periodic table and the rare earth metals. Compounds from which the metals may be chlorinated are the sulfides, oxides, carbonates and sulfates. Chlorine may be introduced as such or its source may be a chlorine donor such as ferric chloride or sulfur chloride. The chlorides for the liquid fused salt bath are those of alkali metals, alkaline earth metals, ammonia, zinc, and ferric iron. The chlorination can be performed within a temperature range of 150° C.–1000° C.

14 Claims, No Drawings

PROCESS FOR MAKING RARE EARTH METAL CHLORIDES

BACKGROUND OF THE INVENTION

1. Field of the Invention

The invention lies in the field of forming metal chlorides from metals or metal compounds, such as oxides, sulfides, carbonates and sulfates. The chlorination may be for various purposes, such as the recovery of metals from their ores or for the manufacture of the chloride for subsequent use.

2. Prior Art

Chlorination has long been considered as a means for recovering metal values from ores, scrap and other material. An example is the commercial process for recovering titanium. This process is practical because the chloride, titanium tetrachloride is a liquid a room temperature and a gas at a 136° C. This is in contrast to most other metal chlorides which melt at high temperatures which makes them difficult to chlorinate by direct chlorination under ambient conditions. Because of the high melting points of these chlorides they form an impervious surface on the particles being chlorinated which prevents the chlorination reaction from going to completion. Another difficulty is that the chlorides formed sometimes form viscous liquids which inhibit movement in the fluid beds frequently used in chlorination and which again result in incomplete reaction.

Another major difficulty in producing the high melting point chlorides is that, except in a case where the metal chloride can be removed because it is volatile, the separation of one metal chloride from another is a difficult and expensive procedure. Thus it has been necessary to dissolve the chlorides formed in water to perform separations and purification and this involves substantial expense. Although chlorination of most metals has been demonstrated in the laboratory, it has not been practical commercially for the reasons set forth above.

Iron is an example of a metal which cannot be economically recovered from its ore by present chlorination procedures. This metal is frequently encountered in nature either as an impurity in valuable materials or as a material of value which contains impurities which must be removed in order for the iron to be useful. In processing iron ores or iron-containing materials, chlorination has been suggested as a process route. Thus in U.S. Pat. No. 2,895,796 a process is disclosed directed to recovering iron from pyrite in which the latter is chlorinated to ferrous chloride and sulfur under ambient conditions. The chlorination is conducted in the presence of a liquid solvent of chlorine. Examples show the use of sulfur and sulfur monochloride as such solvents. While this process shows a means for producing ferrous chloride, it does not disclose a practical method for separation of the iron materials from other materials.

In U.S. Pat. No. 3,652,219 a process is also disclosed wherein pyrite is reacted with sulfur chloride in an excess of sulfur chloride to form ferrous chloride. The patentee then chlorinates the iron to ferric chloride which he separates by distillation and then oxidizes the iron to iron oxide. This somewhat overcomes the disadvantage of the process of U.S. Pat. No. 2,895,796, but by an expensive and difficult route, the distillation and subsequent oxidation of ferric chloride.

Processes other than chlorination have been attempted for processing iron from its ores in scrap, and the removal of iron contamination from other valuable materials, as this field is one of the major areas of industrial inorganic chemistry. As respects aqueous systems, it is known to dissolve iron in mineral acids and, after separation from unwanted impurities or form valuable products, to precipitate the iron as an oxide or hydrated oxide. In the aqueous system difficulties can be encountered in terms of difficult-to-filter precipitates and co-precipitation. In the case of sulfur-containing material it is difficult to convert all the sulfur to elemental sulfur in the presence of water. A part of the sulfur is inevitably becoming unwanted sulfate as the process proceeds.

When the metal to be recovered is present in nature as its sulfide, as in the case of iron, zinc and other metals, the recovery problem is compounded by the pollution problem and conformance with environmental clean-air regulations. In the present commercial methods for treating sulfide ores and concentrates, the general practice involves smelting or roasting the sulfides through a complex series of operations which drive off the sulfur as sulfur dioxide. The metal values are effectively recovered by these operations. However, large volumes of sulfur dioxide are produced which are not always conveniently recovered so that series air pollution results. As a substitute, hydrometallurgical processes, which convert the sulfide to elemental sulfur with recovery of the corresponding metal, are being extensively developed. Examples of such processes are those described in U.S. Pat. Nos. 3,673,061; 3,736,238 and 3,766,026, which describe effective process for electrolytic dissolution of sulfide concentrates. Chemical leaching processes as a substitute for the hydrometallurgical processes are described in U.S. Pat. No. 3,767,543 and U.S. Bureau of Mines Report on Investigations 7474.

A major difficulty with the present hydrometallurgical processes is that it is not practically possible to convert all the sulfide sulfur to elemental sulfur with them. A part of the sulfur is inevitably converted to sulfate which constitutes a waste of energy and a disposal problem. Further, the sulfur is finely divided and intermixed with gangue so that special processes are required for its economic recovery. Also, it is not possible with presently available hydrometallurgical processes to work at very high concentrations of valuable metal, so that large volumes of solutions must be heated, cooled, pumped, and processed.

Accordingly, it is the principal object of this invention to provide a process for the chlorination of metals from their compounds which is a substantially pollution-free process, which is free of the problem of formation of high melting chlorides which coat particles of the compound, which avoids the formation of a stickey liquid sulfur, and which obviates other problems of the prior art processes for recovery of metals from the ores.

SUMMARY OF THE INVENTION

An uncombined metal or a metal of a compound such as a sulfie, oxide, carbonate or sulfate, is converted in a liquid fused salt bath to the corresponding metal chloride at low temperature and ambient pressure by reacting the metal or metal chloride with chlorine gas, introduced as such or supplied by a chlorine donor. It is a requirement that the formed metal chloride be soluble in the liquid fused salt bath mixture. The metals for which the process is operative are those of groups 1b, 2a, 2b, 3a, 3b, 4a, 5a and 8 of the periodic table and rare earth metals. The chlorine donors are ferric chloride and sulfur chloride. The liquid fused salt bath is made up of chlorides of alkali metals, alkaline earth metals, ammonia, zinc and ferric iron. Because the formed metal chlorides are soluble in the liquid fused salt bath, they can be recovered by various conventional means.

PREFERRED EMBODIMENTS OF THE INVENTION

The invention is based on the discovery that metal oxides, sulfides, carbonates and sulfates react with chlorine in relatively low temperature liquid fused baths to give the corresponding metal chlorides in liquid systems having melting points far below those of the metal chlorides. The same is true for uncombined metals. Because the formed chlorides are soluble in these low temperature liquid fused salt baths, the chlorides of the metals can be readily recovered from the liquid fused salt bath. The liquid fused salt bath must be selected so that the metal chloride produced is substantially soluble in the bath. In the case of metal sulfides, for example, the solution of the metal chloride as it is formed permits the rapid and complete reaction of the sulfide to elemental sulfur and metal chloride dissolved in the liquid fused salt mass. For example, ferric chloride and sodium chloride form a liquid fused salt bath at about 46 mole percent sodium chloride which melts at 156° C. If this liquid fused salt bath or melt is held at a temperature at or above its melting temperature and the appropriate sulfides are injected into it, with an inert carrier gas, for example, it has been found that a reaction will occur in which elemental sulfur and the metal chloride are formed, some of the ferric chloride being reduced to ferrous chloride.

It is a feature of the invention that it can be operated at relatively low temperatures, that is, temperatures below the melting point of the formed chlorides when they are not in the liquid feed salt bath. For example, ferrous chloride melts at 670° C. but at 420° C. it is soluble to about 35 mole percent in a liquid fused salt bath of ferric chloride and sodium chloride. It is therefore possible to rapidly and completely react about 12 mole percent of pyrite with chlorine in a sodium chloride-ferric chloride liquid fused salt bath at a temperature of about 420° C. Cerium chloride has a melting point of 800° C., yet it can be chlorinated with the present invention at 300° C. and chlorinates rapidly at 400° C.

The temperaure required for rapid reaction depends upon the mineral or metal being processed and the components of the liquid fused salt bath. Thus, for example, in a ferric chloride-sodium chloride liquid fused salt bath mixture, chalcopyrite reacts very rapidly at 250° C., pyrite at 300° C. and sphalerite reacts rapidly at 350° C.

As to the sulfur recovery problem, at temperatures less than 400° C., but above the melting point of sulfur, the sulfur will be found as a molten pool floating on the liquid fused salt bath, from which it is readily separated. At temperatures near 440° C., the boiling point of sulfur, the sulfur is readily volatilized and can be easily condensed to a liquid without escape to the atmosphere.

The amount of the metal compound which can be reacted with chlorine either introduced as such or from the chlorine donor, varies with the reactants and the composition of the liquid fused salt bath mixture. For example, the amount of sulfide which can be reacted with a given amount of ferric chloride is a function of the solubility of the metal chloride formed at the reaction temperature and the solubility of ferrous chloride. Where ferric chloride is used as the chlorine donor it is sometimes convenient to bubble in chlorine gas to reconvert some or all of the ferrous chloride back to ferric chloride for converting more metal sulfide.

The process is illustrated by reference to certain specific minerals. Pyrite reacts according to the following reaction:

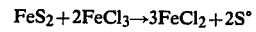

$$FeS_2 + 2FeCl_3 \rightarrow 3FeCl_2 + 2S°$$

At 420° C. ferrous chloride is soluble to about 35 mole percent in a liquid fused salt bath of ferric chloride and sodium chloride. It is therefore possible to rapidly and completely react about 12 mole percent pyrite in a sodium chloride-ferric chloride liquid fused salt bath. The amount of pyrite to be reacted can be increased by injecting chlorine because of the reaction:

$$2FeCl_2 + Cl_2 \rightarrow 2FeCl_3$$

Another liquid fused salt bath which has been found effective is a zinc chloride-sodium chloride mixture having about 60 mole percent sodium chloride which melts at 262° C. A zinc chloride-sodium chloride liquid fused salt bath has an appreciable solubility for other metal chlorides such as iron chloride, being capable of dissolving about 30 mole percent ferrous chloride at 400° C. as an example. The process is illustrated as follows:

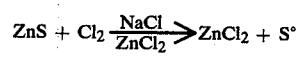

$$ZnS + Cl_2 \xrightarrow[ZnCl_2]{NaCl} ZnCl_2 + S°$$

or

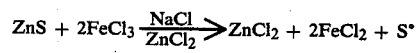

$$ZnS + 2FeCl_3 \xrightarrow[ZnCl_2]{NaCl} ZnCl_2 + 2FeCl_2 + S°$$

Similarly, chalcopyrite is processed as follows:

$$CuFeS_2 + 1.5Cl_2 \xrightarrow[ZnCl_2]{NaCl} CuCl + FeCl_2 + 2S°$$

The important factor is that the ferrous chloride (melting point 670° C.) and cuprous chloride (melting point 422° C.) be soluble in the liquid fused salt melt at the temperature of the reaction.

It is preferable to use ferric chloride as one of the salts of the liquid fused salt bath because it is readily reduced to ferrous chloride giving up an atom of chlorine so that is also serves as a chlorine donor. Further, chlorine can be advantageously added to readily rechlorinate the ferrous chloride and thereby decrease the amount of high melting products in the reaction media. Other liquid fuses salt bath mixtures can be used as the reaction media for forming high melting point chlorides; for example, a zinc chloride-sodium chloride liquid fused salt bath. The particular liquid fused salt bath used as the reaction media will vary depending upon the criteria of solubility of the metal chloride being formed.

The temperature of reaction for the formation of the metal chloride in the liquid fused salt bath will vary with the solubility of the formed chloride in the fused bath reaction media. Ferric chloride and sodium chloride form a liquid fused salt bath at a temperature as low as 156° C. This liquid bath provides a lower practical operating limit for most chlorinations. Although ferric chloride sublimes at 350° C. this is effectively prevented by the presence of sodium chloride in the liquid fused salt bath. Liquid fused salt bath mixtures having temperatures as high as 550° C. have been found practical. This is well above the boiling point of sulfur which is thus readily removed and recovered. A temperature range between 150°–1100° C. is operative.

The reaction of zinc sulfide with ferric chloride in a liquid fused salt bath of ferric chloride-zinc chloride-sodium chloride is as follows:

$$ZnS + 2FeCl_3 \xrightarrow[NaCl]{ZnCl_2} ZnCl_2 + 2FeCl_2 + S^*$$

Chlorination of the metal oxide presents a slightly different problem than chlorination of the sulfides in that a reductant, such as carbon or sulfur, is additionally frequently added to the fused salt bath. If the metal oxide is added to a ferric chloride-sodium chloride liquid fused bath, for example, along with a suitable reductant, such as carbon or sulfur, the oxide will be reduced and the corresponding metal chloride formed. Reaction temperatures will depend upon the metal being chlorinated. Base metal oxides, such as zinc, lead and copper oxides, chlorinate readily below 400° C. Rare earth metal oxides also chlorinate rapidly at 400° C.

The chlorination of oxides is illustrated by the following reactions:

$$Fe_2O_3 + 1.5C + 4FeCl_3 \rightarrow 6FeCl_2 + 1.5CO_2$$

$$ZnO + 0.5C + 2FeCl_3 \rightarrow ZnCl_2 + 2FeCl_2 + 0.5CO_2$$

$$La_2O_3 + 1.5C + 3Cl_2 \rightarrow 2LaCl_3 + 1.5CO_2$$

$$La_2O_3 + 1.5S + 3Cl_2 \rightarrow 2LaCl_3 + 1.5SO_2$$

In addition to oxides, sulphates may be chlorinated in the same manner. An example is:

$$BaSO_4 + C + Cl_2 \rightarrow BaCl_2 + CO_2 + SO_2$$

In each case the important factor that permits a good chlorination at low temperature is that the resulting metal chloride is soluble in the liquid fused salt bath at the temperature of reaction, The recovery of the formed chloride salt may be accomplished by conventional methods. The liquid fused salt bath mixture may be selectively cooled to crystallize the desired metal chloride followed by its separation by a liquid/solids separation such as filtration. Ferrous chloride, for example, can be crystallized from the melt by cooling and recovered by filtration. The iron can then be recovered from the ferrous chloride as ferric oxide by oxidation of the ferrous chloride to precipitate the iron oxide and regenerate the ferric chloride chlorinating agent in accordance with the following reaction:

$$6FeCl_2 + 1.5O_2 \rightarrow Fe_2O_3 + 4FeCl_3$$

The iron oxide is readily removed from the recycle ferric chloride by filtration or by volatilization of the ferric chloride.

The metal compounds for which the process is operative are those of the metals of the groups of the periodic table, 1b, 2a, 2b, 3a, 3b, 4a, 5a, 8 and the rare earth metals. The compounds of these metals for which the process is operative are the sulfides, oxides, carbonates and sulfates. The process is operative for chlorinating metals, such as iron, in the uncombined state.

The salts which are operative for the liquid fused salt bath mixture are the chlorides of the alkali metals, alkaline earth metals, zinc, ferric iron and ammonia. Typical of these salts are the chlorides of sodium, potassium, lithium, calcium, barium, zinc, ferric iron and ammonia. The composition of the bath used will depend upon the required melting temperature of the liquid fused salt bath mixture. As previously stated, it is preferred to have ferric chloride in the mixture as it also may serve as a donor of chlorine. This is because iron exists in the two-valent state and the ferric chloride is reduced to ferrous chloride in the reaction. The other chlorides in the fused bath mixture do not enter into the reaction.

A large number of liquid fused salt bath mixtures are suitable. For example, sodium chloride-ferric chloride forms a liquid fused salt bath at about 48 mole percent sodium chloride with a melting point as low as 156° C. Ferrous chloride forms with ferric chloride and sodium chloride a ternary system in which ferrous chloride has increasing solubility with increasing temperature. At 420° C. about 35 mole percent chloride is liquid. Similarly, zinc chloride forms a liquid fused salt bath with sodium chloride. At about 46 mole percent zinc chloride the melting temperature is 262° C. Ferrous chloride, zinc chloride and sodium chloride form a ternary system which again is a solvent for ferrous chloride at 400° C. A large number of other chloride salt combinations are possible and practical. The essential requirements are that the salt bath be liquid at the operating temperature chosen and that the metal chloride be soluble in reasonable amounts in the bath at the operating temperature chosen.

For the metals and metal compounds for which this invention is operative a reaction temperature not in excess of 450° C. is preferred. The preferred operation reaction temperature range is between about 350° and 450° C. It is a decided advantage of the invention that it is operated at a temperature below the softening point of glass, which is about 500° C. In view of this, the chlorination reactions can be performed in glass equipment or glass-lined equipment.

Of course, when ferric chloride is not used as one of the salts of the liquid fused salt bath, chlorine gas must be introduced into the bath or sulfur chloride, or other chloride, used as the chlorine donor.

The invention is illustrated by the examples which follow, which are not limiting of the invention.

Although the particle size of the metal ore, compound, etc. introduced is not critical, and a particle size of ½ inch or more can be used, for the examples the particle size varied from −14 mesh to −325 mesh. Obviously, the more of the sample which is ground to a small particle size, the more surface area will be available for the chlorination reaction and, accordingly, the more effective the chlorination will be in terms of reaction rate and reaction completion.

EXAMPLE 1

A liquid fused salt bath melting at 350° C. was made of 600 grams of a ferric chloride-sodium chloride. Fifty grams of pyrite were added and chlorine bubbled into the reaction mass for a period of about one hour. At the end of this time, when the reaction was substantially complete, elemental sulfur floated as a liquid on the salt mass. Analysis showed that all the pyrite had been reacted.

EXAMPLE 2

A liquid fused salt bath melting at 260° C. was made of 500 grams of ferric chloride-sodium chloride-zinc chloride-potassium chloride. One hundred grams of calcopyrite were added to the liquid fused salt bath and chlorine bubbled into it when it became viscous. After about an hour, analysis of the bath showed that 99 percent of the copper had been reacted to form water soluble copper.

EXAMPLE 3

Four hundred grams of a liquid fused salt bath of potassium chloride-zinc chloride melting at 250° C. was formed. A high arsenic, nickel, cobalt, sulphide concentrate, difficult to process in an aqueous system, containing 10.5 percent copper, 2.4 percent cobalt, and 0.2 percent nickel was used, the sample weighing 50 grams. After addition of the sample, chlorine was bubbled into the liquid fused salt bath mixture until analysis showed that 99 percent of the added copper and 97 percent of the added nickel and cobalt were water soluble. The gases given off and collected in a condenser were found by analysis to contain soluble arsenic.

EXAMPLE 4

Forty-eight grams of a copper (5.1 percent), nickel (3 percent) sulfide concentrate was reacted in 600 grams of a liquid fused salt bath of ferric chloride and sodium chloride at 410° C. with chlorine which was bubbled through the liquid fused salt bath. At the completion of the reaction 99 percent of the copper and 99 percent of the nickel were found to be water soluble, indicating conversion of the metals to their chlorides.

EXAMPLE 5

A galena concentrate containing substantial amounts of antimony (1.9 percent) and silver (100 ounces/ton) was reacted in a liquid fused salt bath of ferric chloride and sodium chloride at 300° C. with chlorine which was bubbled through the bath. Acid soluble antimony and elemental sulfur were collected in a condenser. 99 percent of the lead was found to be soluble in an aqueous brine solution along with 95 percent of the silver.

EXAMPLE 6

One hundred grams of a copper sulfide-arsenide concentrate containing 5.8 troy ounces/ton silver and 0.8 troy ounces/ton gold was reacted with 600 grams of a liquid fused salt bath of ferric chloride and sodium chloride at a temperature of 400° C. No chlorine was introduced. Over 97 percent of the copper and 98 percent of the silver were found to be water soluble. The residue from the water solution was found to be concentrated in gold to 2.9 ounces per ton (the gold not having reacted with ferric chloride). The residue was reacted a second time in a liquid fused salt bath of ferric chloride and sodium chloride at 420° C. with chlorine which this time was bubbled through the bath. The gold all volatilized as an auric chloride. This example illustrates the capability to dissolve base metals and silver away from a gold-containing material by the use of ferric chloride, and the recovery of the gold by the use of chlorine.

EXAMPLE 7

One hundred eighty-five grams of a commercial lead-zinc-copper-silver sulfide concentrate was reacted with chlorine at 425° C. in a liquid fused salt bath of the ferric chloride-sodium chloride-zinc chloride. Elemental sulfur was collected in a condenser. It was found that 92 percent of the zinc and 86 percent of the lead were soluble in aqueous brine, whereas none of the coper or silver was soluble. The copper-silver residue was reacted in a liquid fused salt brine of the same composition at 420° C. with additional chlorine. In addition to bringing the overall lead and zinc solubility to above 98 percent, 97 percent of the copper and 98 percent of the silver were found to be soluble in aqueous brine. This illustrates the capability to react and separate the bulk of such active metals as lead and zinc from such more nobel metals as copper and silver.

EXAMPLE 8

A zinc oxide residue containing 11.39 percent zinc a coke was reacted in a ferric chloride-sodium chloride liquid bath with chlorine at about 400° C. 82 percent of the zinc was found to have been converted to water solubilizing chloride. This illustrates the fact that oxides as well as sulfides may be chlorinated by the process of the invention.

EXAMPLE 9

Lanthanum oxide was blended with activated carbon and reacted in a liquid fused salt bath of ferric chloride-sodium chloride at 420° C. with chlorine which was bubbled through the bath. 99 percent of the lanthanum was converted to a water soluble chloride.

EXAMPLE 10

Ceric oxide was blended with pulverized coal and reacted in a liquid fused salt bath of ferric chloride-sodium chloride at 420° C. wih chlorine added to the bath. 91 percent of the cerium was converted to a water soluble chloride.

EXAMPLE 11

Bastnasite, a rear earth fluocarbonate mineral, was combined with coal and reacted with chlorine at 400° C. in a liquid fused salt of ferric chloride-sodium chloride. 77 percent of the rare earths in the bastnasite were found to have been converted to water soluble chlorides.

EXAMPLE 12

Lanthanum oxide was reacted with chlorine in a liquid fused salt bath of ferric chloride-sodium chloride without any reductant at 420° C. The lanthanum all reacted to produce water soluble lanthanum chloride while a corresponding amount of iron oxide was formed. Thus, in addition to effective chlorination it is possible to exchange more strongly chloride affinity elements for more strongly oxide affinity elements in the liquid state.

EXAMPLE 13

Barium sulfate was blended with activated carbon and chlorinated at 420° C. in a liquid fused salt bath of ferric chloride-sodium chloride. 40 percent of the barium was found to be water soluble. This shows the operability of the process on sulfates as well as oxides and sulfides.

The examples illustrate that all of the chlorinating reactions proceeded substantially to completion and, therefore, there was no initial formation of high melting chlorides to preclude the reactions going to completion, as occurs in direct chlorination procedures of the propr art not performed in a liquid fused salt bath.

It is seen from the above description and the results of the examples that a process has been provided for chlorinating metal in compounds to their high melting chlorides in which the chlorination can be performed at temperatures below 500° C. The process provides an economic procedure for recovering metals from their ores and other compounds through a chlorination route which was not previously available in the prior art.

What is claimed is:

1. A process for chlorinating a rare earth metal oxide to its chloride consisting essentially of:
   (a) forming a liquid fused salt bath having a lower melting temperature than that of said chloride and wherein said liquid fused salt bath comprises ferric chloride and at least one other metal chloride selected from the group consisting of alkali metal chlorides, alkaline earth metal chlorides, zinc chloride, and ammonium chloride, which bath dissolves the rare earth metal chloride to be formed;
   (b) introducing said rare earth metal oxide into said liquid fused bath having a temperature of from about 150° C. to about 550° C. to form said rare earth metal chloride; and
   (c) recovering the formed rare earth metal chloride from the fused bath mixture.

2. The process of claim 1 in which said rare earth metal oxide is cerium oxide.

3. The process of claim 1 in which a reducing agent is added to the liquid fused salt bath.

4. The process of claim 3 in which the reducing agent is sulfur or carbon.

5. The process of claim 1 wherein an additional source of chlorine is added to the fused bath.

6. The process of claim 5 wherein the additional source of chlorine is selected from the group consisting of chlorine, chlorine donor and mixtures thereof.

7. The process of claim 5 in which said chlorine donor is sulfur chloride.

8. The process of claim 5 in which said chlorine donor is ferric chloride.

9. The process of claim 6 in which chlorine is introduced into said fused bath as the additional source of chlorine.

10. The process of claim 5 in which the chlorine donor is a member selected from the group consisting of sulfur chloride and ferric chloride.

11. The process of claim 1 in which the salts of the liquid fused salt bath comprise sodium cloride and ferric chloride.

12. The process of claim 1 in which the salts of the liquid fused salt bath comprise ferric chloride and zinc chloride.

13. The process of claim 1 in which the salts of the liquid fused salt bath comprise ferric chloride, sodium chloride, zinc chloride and potassium chloride.

14. The process of claim 1 in which the rare earth metal oxide is lanthanum oxide.

* * * * *